US011792692B2

(12) United States Patent
Nunna et al.

(10) Patent No.: US 11,792,692 B2
(45) Date of Patent: Oct. 17, 2023

(54) PERSONALIZED DATA THROTTLING IN A RESIDENTIAL WIRELESS NETWORK

(71) Applicant: ARRIS Enterprises LLC, Suwanee, GA (US)

(72) Inventors: Kumar Nunna, Karnataka (IN); Lakshmi Arunkumar, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/479,527

(22) Filed: Sep. 20, 2021

(65) Prior Publication Data

US 2022/0095166 A1    Mar. 24, 2022

Related U.S. Application Data

(60) Provisional application No. 63/082,780, filed on Sep. 24, 2020.

(51) Int. Cl.
| | |
|---|---|
| *H04W 28/12* | (2009.01) |
| *H04W 88/16* | (2009.01) |
| *H04W 28/02* | (2009.01) |

(52) U.S. Cl.
CPC ........... *H04W 28/12* (2013.01); *H04W 88/16* (2013.01); *H04W 28/0289* (2013.01)

(58) Field of Classification Search
CPC ............. H04W 28/02; H04W 28/0205; H04W 28/0221; H04W 28/12; H04W 88/16; H04W 28/0284; H04W 28/0289
See application file for complete search history.

(56) References Cited

U.S. PATENT DOCUMENTS 5,442,630 A * 8/1995 Gagliardi ............ H04L 12/4612
                                                        370/473
7,603,473 B2 * 10/2009 Hester ..................... H04L 67/60
                                                        370/468
(Continued)

FOREIGN PATENT DOCUMENTS

| EP | 1 950 908 | 7/2008 | |
| EP | 1959630 A2 * | 8/2008 | ............. H04L 47/10 |

(Continued)

OTHER PUBLICATIONS

International Search Report and Written Opinion of the International Searching Authority dated Jan. 4, 2022, in International (PCT) Application No. PCT/US2021/051071.

(Continued)

*Primary Examiner* — Kevin D Mew
(74) *Attorney, Agent, or Firm* — Wenderoth, Lind & Ponack, L.L.P.

(57) ABSTRACT

An apparatus, method, and computer-readable recording medium perform local client device data throttling in a wireless network. A network controller of a gateway device allocates a portion of a periodic allocation of data available from an ISP cycle to one or more client devices connected to the gateway device. The gateway device sets a threshold for each client device and monitors bandwidth data consumption for each of the client devices. When a particular client device reaches its assigned bandwidth data allotment, the gateway device throttles data to the client device until a new periodic allocation of data is available from the ISP. While a particular client device is throttled, when a guest device joins the network or a particular client device accesses a prestored URL address, the gateway device may reallocate allotted data from one client device to another as needed to maintain operation of the wireless network.

20 Claims, 11 Drawing Sheets

(56) References Cited

U.S. PATENT DOCUMENTS

| | | | |
|---|---|---|---|
| 9,185,031 B2* | 11/2015 | Okita | H04L 43/16 |
| 9,769,131 B1* | 9/2017 | Hartley | G06F 3/0622 |
| 10,063,383 B1* | 8/2018 | Kanakarajan | H04L 47/125 |
| 10,122,829 B2* | 11/2018 | Saavedra | H04L 12/2863 |
| 2003/0096619 A1* | 5/2003 | Winberg | H04W 28/18 455/453 |
| 2004/0100903 A1 | 5/2004 | Han et al. | |
| 2012/0089664 A1* | 4/2012 | Igelka | G06F 9/5083 709/203 |
| 2013/0254375 A1* | 9/2013 | Agiwal | H04L 43/16 709/224 |
| 2014/0006822 A1* | 1/2014 | Diab | H04L 43/0882 713/320 |
| 2015/0257081 A1* | 9/2015 | Ramanujan | H04L 45/24 370/329 |
| 2015/0289279 A1* | 10/2015 | Xu | H04W 72/52 370/329 |
| 2015/0304187 A1 | 10/2015 | Brown | |
| 2016/0080502 A1* | 3/2016 | Yadav | H04L 45/125 709/227 |
| 2016/0135214 A1* | 5/2016 | Chendamarai Kannan | H04W 72/1268 370/280 |
| 2016/0219024 A1* | 7/2016 | Verzun | H04L 9/34 |
| 2017/0155580 A1* | 6/2017 | Ramanujan | H04L 45/125 |
| 2018/0359811 A1* | 12/2018 | Verzun | H04W 28/12 |
| 2022/0046473 A1* | 2/2022 | Strater | H04L 5/0037 |

FOREIGN PATENT DOCUMENTS

| | | | | |
|---|---|---|---|---|
| WO | WO-2005064955 A1 * | 7/2005 | | C23C 16/4408 |
| WO | WO-2009083611 A1 * | 7/2009 | | H04L 12/5695 |
| WO | WO-2015157200 A1 * | 10/2015 | | H04W 72/0413 |

OTHER PUBLICATIONS

International Preliminary Report on Patentability dated Mar. 28, 2023 in International (PCT) Application No. PCT/US2021/051071.

* cited by examiner

PERSONALIZED DATA THROTTLING IN A RESIDENTIAL WIRELESS NETWORK

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g. gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP, or mesh protocol, defines the control protocols and the data objects necessary to enable onboarding, provisioning, control, and management of wireless devices in a wireless network.

A wireless network implementing the MAP or mesh protocol (e.g. MAP or mesh network) generally includes the use of a MAP control device for the control and management of devices in the wireless network to improve the quality of experience (QoE) for users. All of these improvements have contributed to the growth in data bandwidth that is consumed by client devices connected to a home wireless network. This growth in data consumption has caused internet service providers (ISPs) to impose data limits on each home network. For example, some ISPs may provide data transfers in blocks of data that are purchased separately. Other ISPs throttle home networks either when network congestion is high or after a home network has consumed an allotted amount of data during a time period, which is typically a month or a billing cycle.

Certain client devices attached to the home networks perform functions that require a constant availability of data rather than intermittent usage or non-critical network performance uses. For example, a security webcam client provides a constant data stream, which may be streaming video images or may be a set of still images taken at a defined frequency, in order for the security function to be provided. This type of client device may require a higher priority access to available bandwidth before the ISPs implement their throttling measures. In contrast, a client surfing web pages such as news sources or social media websites may not require the same level of guaranteed network performance.

Thus, it would be advantageous and an improvement over the relevant technology to provide prioritized sharing of available data consumption among known client devices on a home network in order to guarantee available bandwidth for high priority clients. The present invention attempts to address the limitations and deficiencies of existing solutions according to principles and example embodiments disclosed herein.

SUMMARY

An aspect of the present disclosure provides a gateway device for personalized data throttling of individual client devices in a residential wireless network. The wireless network is configured to communicatively interconnect the gateway device, one or more wireless extenders, and one or more client devices. In this aspect of the present disclosure, the gateway device includes a network controller, a non-transitory memory storing a program, and a communication interface configured to establish communication connections with the one or more client devices and the one or more wireless extenders via the wireless network.

The network controller is configured to execute the program to allocate periodically available data transfer amounts for each of the one or more client devices using a connection to the Internet via the one or more client devices, separately monitor data transfer amounts used by each of the one or more client devices over the connection associated with each of the one or more client devices, and in a case in which the gateway device has determined that one of the client devices has used all of the allocated data transfer amounts, throttle the connection associated with the one of the client device.

In another aspect of the present disclosure, the network controller further receives commands from an administrator to re-allocate a specified amount of available data transfer amounts currently available to a first client device to a second client device and re-allocates the specified amount of available data transfer amounts currently available to a first client device to a second client device.

In another aspect of the present disclosure, the network controller further detects a guest device joining a wireless network supported by gateway device; re-allocates the specified amount of available data transfer amounts currently available to a first client device to the guest device, and continues to separately monitor data transfer amounts used by each of the one or more client devices over the connection associated with each of the one or more client devices.

In another aspect of the present disclosure, the network controller further detects the guest device leaving the wireless network supported by gateway device and re-allocates any remaining amount of available data transfer amounts currently available to the guest device back to its original client device.

In another aspect of the present disclosure, the network controller further detect a third client device accessing a website accessed using a prestored URL address and re-allocates the specified amount of available data transfer amounts currently available to a fourth client device to the third device.

In another aspect of the present disclosure, the network controller further throttles the connection associated with the one of the client device in a case in which the gateway device has determined that the second client devices has used all of the re-allocated data transfer amounts.

In another aspect of the present disclosure, throttling one of the client devices comprises fully blocking data transfers to and from the Internet to prevent further consumption of bandwidth data.

In another aspect of the present disclosure, throttling one of the client devices comprises reducing the uplink and downlink data transfer speeds to a low level in order to keep the connection operational while consuming a negligible amount of bandwidth data.

An aspect of the present disclosure provides a method for personalized data throttling of individual client devices in a residential wireless network. The wireless network is configured to communicatively interconnect a gateway device, one or more wireless extenders, and one or more client devices. The method includes allocating periodically available data transfer amounts for each of the one or more client devices using a connection to the Internet via among the one or more client devices, separately monitoring data transfer amounts used by each of the one or more client devices over the Internet connection associated with each of the one or more client devices, and in a case in which the gateway device has determined that one of the client devices has used all of the allocated data transfer amounts, throttling the connection associated with the one of the client device.

The method also includes receiving commands from an administrator to re-allocate a specified amount of available data transfer amounts currently available to a first client device to a second client device and re-allocating the specified amount of available data transfer amounts currently available to a first client device to a second client device.

In an aspect of the present disclosure, the method also includes detecting a guest device joining a wireless network supported by gateway device, re-allocating the specified amount of available data transfer amounts currently available to a first client device to the guest device, and continuing to separately monitor data transfer amounts used by each of the one or more client devices over the connection associated with each of the one or more client devices.

In an aspect of the present disclosure, the method also includes detecting the guest device leaving the wireless network supported by gateway device, and re-allocating any remaining amount of available data transfer amounts currently available to the guest device back to its original client device.

In an aspect of the present disclosure, the method also includes detecting a third client device accessing a web site accessed using a prestored URL address and re-allocating the specified amount of available data transfer amounts currently available to a fourth client device to the third device.

In an aspect of the present disclosure, the method also includes throttling the connection associated with the one of the client device in a case in which the gateway device has determined that the second client devices has used all of the re-allocated data transfer amounts.

An aspect of the present disclosure provides a non-transitory computer-readable recording medium in a gateway device for client optimized onboarding in a wireless network with the wireless network configured to communicatively interconnect the gateway device, one or more wireless extenders, and one or more client devices; and the non-transitory computer-readable recording medium storing one or more programs, which when executed by a network controller of the gateway device, performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustrative purposes only, and not for the purpose of limiting the present disclosure as defined by the appended claims and their equivalents.

Figure 1:
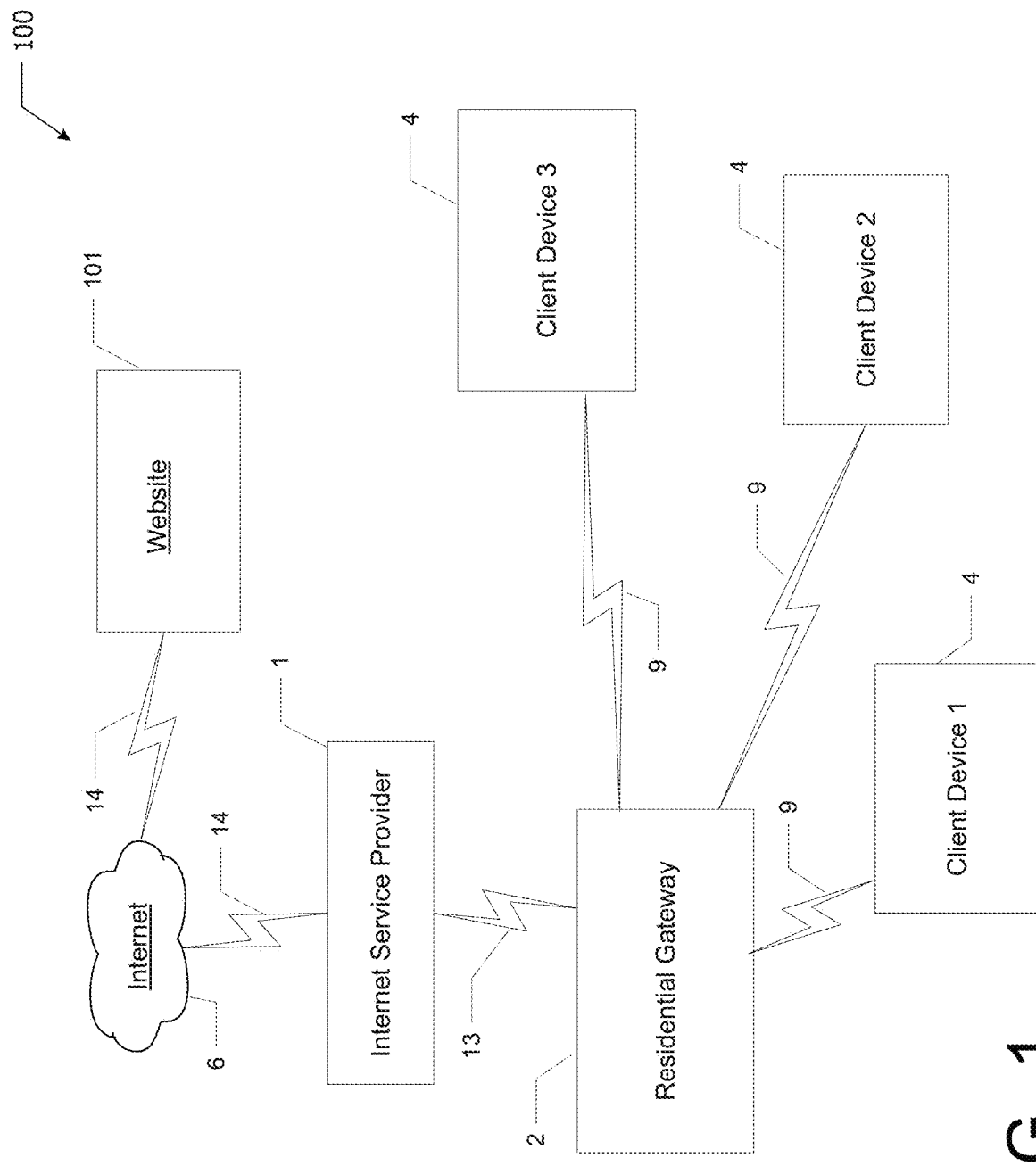
FIG. 1 is a schematic diagram of a system according to an embodiment of the present disclosure.

FIG. 1 is a schematic diagram of a system according to an embodiment of the present disclosure. As shown in FIG. 1, the main elements of the system include a gateway device 2 connected to the Internet 6 via an Internet Service Provider (ISP) 1 and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul, or Internet of Things (IoT) networks) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line, a public switched data network (PSDN), a global Telex network, or 2G, 3G, 4G or 5G networks, for example.

The connection 13 can further include as some portion thereof a broadband network connection, an optical network connection or other similar connections. For example, the connection 13 also can be implemented using a fixed wireless connection that operates in accordance with, but is not limited to, 3rd Generation Partnership Project (3GPP), Long Term Evolution (LTE) or 5G protocols.

The gateway device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content and playing over-the-top (OTT)- or multiple system operator (MSO)-provided content.

The connection 9 between the gateway device 2, the wireless extenders (not shown), and client devices 4 can be implemented using a wireless connection in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to: RF4CE, ZigBee, Z-Wave or IEEE 802.15.4 protocols. It is also contemplated by the present disclosure that the connection 9 can include connections to a media over coax (MoCA) network. One or more of the connections 9 also can be a wired Ethernet connection.

The gateway device 2 also may utilize one or more wireless extenders (not shown) to provide expanded wireless coverage over larger spaces. For the purposes of this disclosure, the wireless extenders may be viewed as part of the functionality of the gateway 2 to connect to client devices 4 wherever the client devices 4 are located on the wireless network. These wireless extenders can be, for example, hardware electronic devices such as access points used to extend the wireless network by receiving the signals transmitted by the gateway device 2 and rebroadcasting the signals to, for example, client devices 4 which may be out of range of the gateway device 2. The wireless extenders 3 also can receive signals from the client devices 4 and rebroadcast the signals to the gateway device 2 or other client devices 4.

The connection 11 between the wireless extenders and the client devices 4 are implemented through a wireless connection that operates in accordance with any IEEE 802.11 Wi-Fi protocols, Bluetooth protocols, Bluetooth Low Energy (BLE) protocols or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 can be implemented using a wireless connection that operates in accordance with, but is not limited to: RF4CE, ZigBee, Z-Wave or IEEE 802.15.4 protocols. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, cellular networks that interconnect with other devices via Wi-Fi and Bluetooth or other wireless hand-held consumer electronic devices capable of executing and displaying content received through the gateway device 2. Additionally, the client devices 4 can be a TV, an IP/QAM STB or an SMD that is capable of decoding audio/video content and playing OTT- or MSO-provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 also can be implemented through a WAN, a LAN, a VPN, MANs, PANs, WLANs, SANs, a DOCSIS network, a fiber optics network (e.g., FTTH, FTTX, or HFC), a PSDN, a global Telex network, or 2G, 3G, 4G or 5G networks, for example.

The connection 10 also can be implemented using a wireless connection in accordance with Bluetooth protocols, Bluetooth Low Energy (BLE) protocols or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 also can be a wired Ethernet connection.

Figure 2:
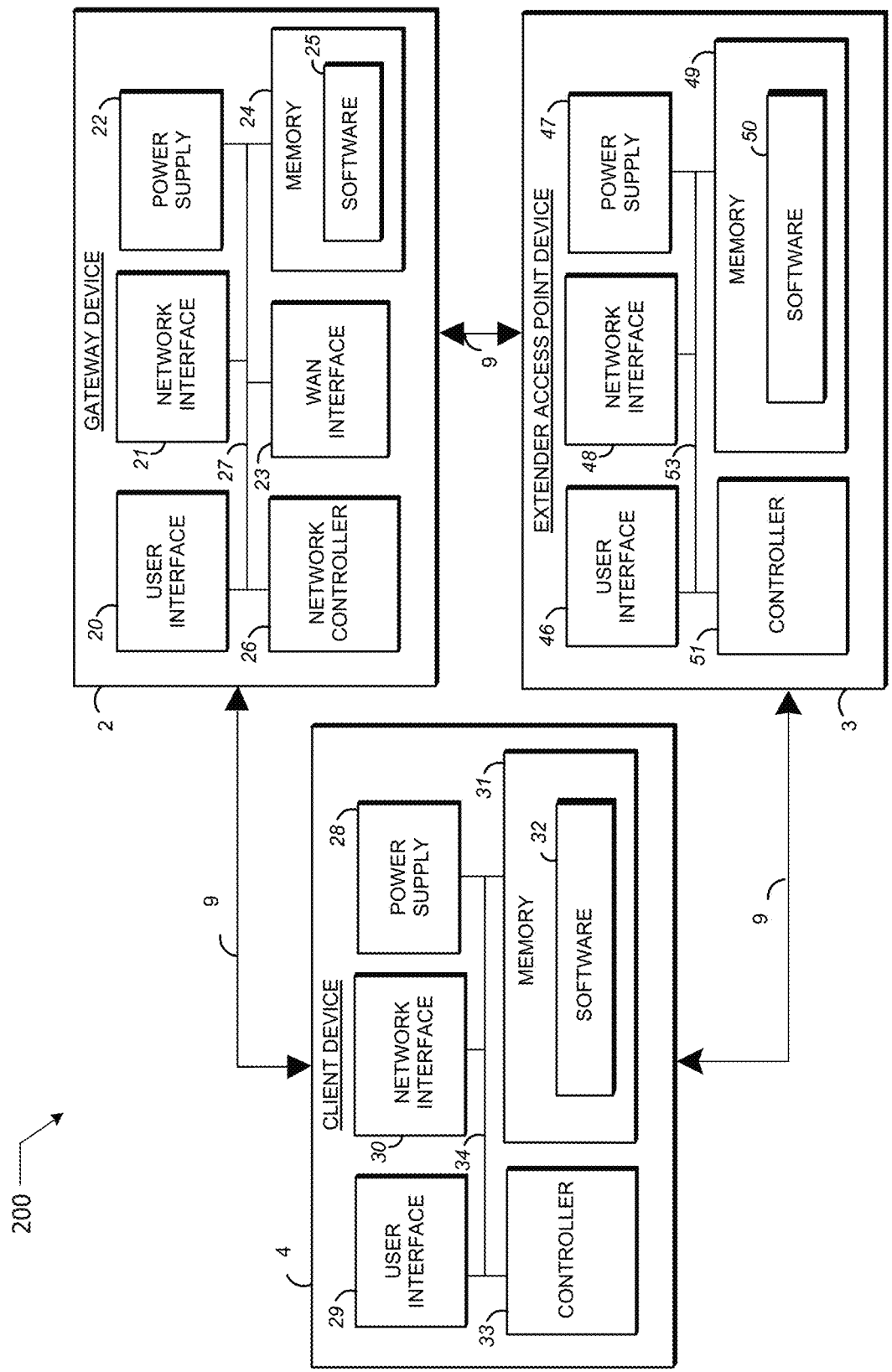
FIG. 2 is a more detailed schematic diagram of an exemplary gateway device, client device, and wireless extender implemented in the system of FIG. 1 according to an embodiment of the present disclosure.

A detailed description of the exemplary internal components of the gateway device 2, the wireless extenders, and the client devices 4 shown in FIG. 1 will be provided in the discussion of FIG. 2. However, in general, it is contemplated by the present disclosure that the gateway device 2 and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all or some of the computing components in the gateway device 2, the wireless extenders 3, and the client devices 4 may be adapted to execute any operating system, including Linux™, UNIX™, Windows™, MacOS™, DOS™, and ChromeOS™, as well as virtual machines adapted to virtualize execution of a particular operating system, including customized and proprietary operating systems. The gateway device 2 and the client devices 4 are further equipped with components to facilitate communication with other computing devices over the one or more network connections to local and wide area networks, wireless and wired networks, public and private networks, and any other communication network enabling communication in the system.

In the example embodiment of FIG. 1, client device 1 4a is considered to be a high priority client that requires a fixed amount of data bandwidth in order to properly operate. An always-on security camera is one example of a high priority client 4a. Client devices 2 and 3 4b are considered low priority clients that may tolerate throttling of available data bandwidth while operating. Family members' personal devices including laptops, tablets, and smartphones may be considered low priority clients. Voice-over-IP telephone lines are an example client device that may be either a high priority device for an important business telephone line and a low priority client for a child's telephone line. Client devices 4 may be characterized as needed by a particular residential home network to provide network services particular to that residential home network.

FIG. 2 is a more detailed schematic diagram of an exemplary gateway device 2, an exemplary wireless extender 3, and an exemplary client device 4 implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9 between the gateway device 2, the wireless extender 3, and the client device 4 shown in FIG. 2 are meant to be exemplary connections and are not meant to indicate all possible connections between the gateway devices 2, wireless extenders 3, and client devices. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g. from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks that interconnect with other devices via Wi-Fi and Bluetooth or other wireless hand-held consumer electronic devices capable of executing and displaying the content received through the gateway device 2. Additionally, the client device 4 can be a TV, an IP/QAM STB, or an SMD that is capable of decoding audio/video content and playing OTT- or MSO-provided content received through the gateway device 2.

As shown in FIG. 2, the client device 4 includes a power supply 28, user interface 29, network interface 30, a memory 31, and a controller 33. The power supply 28 provides power to the internal components of the client device 4 through the internal bus 34. The power supply 28 can be a self-contained power source such as a battery pack with an interface to be powered through an electrical charger connected to an outlet (e.g. either directly or by way of another device). The power supply 28 also can include a rechargeable battery that can be detached allowing for replacement such as nickel-cadmium (NiCd), nickel metal hydride (NiMH), lithium-ion (Li-ion) or lithium polymer (Li-pol) batteries.

The user interface 29 includes, but is not limited to, push buttons, a keyboard, a keypad, a liquid crystal display (LCD), a cathode ray tube (CRT), a thin film transistor (TFT), a light-emitting diode (LED), and a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3 using the wireless protocols in accordance with connection 9 (e.g. as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software or algorithms for controlling the general function and operations of the client device 4 in accordance with the embodiments described in the present disclosure (e.g. including the optimized onboarding of client devices according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP) or other similar processing device capable of executing any type of instructions, algorithms or software for controlling the operation and functions of the client device 4 in accordance with the embodiments described in the present disclosure. Communications between the components (e.g. 28-31 and 33) of the client device 4 may be established using an internal bus 34.

The wireless extender 3 can be, for example, a hardware electronic device such as an access point used to extend a wireless network by receiving the signals transmitted by the gateway device 2 and rebroadcasting the signals to client devices 4 which may be out of range of the gateway device 2. The wireless extender 3 also can receive signals from the client devices 4 and rebroadcast the signals to the gateway device 2, mobile device 5 or other client devices 4.

As shown in FIG. 2, the wireless extender 3 includes a: user interface 46, power supply 47, network interface 48, memory 49, and controller 51. The user interface 46 can include, but is not limited to, push buttons, a keyboard, a keypad, an LCD, a TFT, an LED, and an HD or other similar display device including a display device having touch screen capabilities so as to allow interaction between a user and the wireless extender 3. The power supply 47 provides power to the internal components of the wireless extender 3 through the internal bus 53. The power supply 47 can include a self-contained power source such as a battery pack with an interface to be powered through an electrical charger connected to an outlet (e.g. either directly or by way of another device). The power supply 47 also can include a rechargeable battery that can be detached allowing for replacement such as NiCd, NiMH, Li-ion, or Li-pol batteries.

The network interface 48 can include various network cards, interfaces, and circuitry implemented in software and/or hardware to enable communications with the client device 4 and the gateway device 2 using the wireless protocols in accordance with connection 9 (e.g. as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software or algorithm including software 50 associated with controlling the general functions and operations of the wireless extender 3 in accordance with the embodiments described in the present disclosure (e.g. including optimized onboarding of client devices according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP or other similar processing device capable of executing any type of instructions, algorithms or software for controlling the operation and functions of the wireless extender 3 in accordance with the embodiments described in the present disclosure. General communications between the components (e.g. 46-49 and 51) of the wireless extender 3 may be established using the internal bus 53.

The gateway device 2 can be, for example, a hardware electronic device that can combine the functions of a modem, an access point, and/or a router for providing content received from the content provider 1 to network devices (e.g. wireless extenders 3, client devices 4, and mobile devices 5) in the system. It is also contemplated by the present disclosure that the gateway device 2 can include the function of, but is not limited to, an IP/QAM STB or SMD that is capable of decoding audio/video content and playing OTT- or MSO-provided content.

As shown in FIG. 2, the gateway device 2 includes a: user interface 20, network interface 21, power supply 22, WAN interface 23, memory 24, and network controller 26. The user interface 20 can include, but is not limited to, push buttons, a keyboard, a keypad, an LCD, a CRT, a TFT, an LED, and an HD or other similar display device including a display device having touch screen capabilities so as to allow interaction between a user and the gateway device 2. The network interface 21 may include various network cards, interfaces, and circuitry implemented in software and/or hardware to enable communications with the wireless extender 3 and client device 4 using the wireless protocols in accordance with connection 9 (e.g. as described with reference to FIG. 1). Additionally, the various network cards, interfaces, and circuitry of the network interface 21 enable communications with the mobile device using the wireless protocols in accordance with connection 10 (e.g. as described with reference to FIG. 1).

The power supply 22 provides power to the internal components of the gateway device 2 through the internal bus 27. The power supply 22 can be a self-contained power source such as a battery pack with an interface to be powered through an electrical charger connected to an outlet (e.g. either directly or by way of another device). The power supply 22 also can include a rechargeable battery that can be detached allowing for replacement such as NiCd, NiMH, Li-ion or Li-pol batteries. The WAN interface 23 may include various network cards, interfaces, and circuitry implemented in software and/or hardware to enable communications between the gateway device 2 and the ISP 1 using the wireless protocols in accordance with connection 13 (e.g. as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software or algorithm including software 25 for controlling the general functions and operations of the gateway device 2 and performing management functions related to the other devices (wireless extenders 3 and client devices 4) in the network in accordance with the embodiments described in the present disclosure (e.g. including optimized onboarding of client devices according to the embodiments of the present disclosure).

The network controller 26 controls the general operations of the gateway device 2 as well as performs management functions related to the other devices (wireless extenders 3 and client devices 4) in the network. The network controller can include, but is not limited to, a CPU, a hardware microprocessor, a hardware processor, a multi-core processor, a single core processor, a FPGA, a microcontroller, an ASIC, a DSP or other similar processing device capable of executing any type of instructions, algorithms or software for controlling the operation and functions of the gateway device 2 in accordance with the embodiments described in the present disclosure. Communications between the components (e.g. 20-22, 24, and 26) of the gateway device 2 may be established using the internal bus 27.

As noted above in reference to FIG. 1, an extender device 3 may or may not be present in a residential home network according to the present invention. These extender devices 3 work together to provide a data connection between the data device 2 and the client devices 4. All other operations and functions described herein that are performed by the gateway device 2 and the client devices 4 operate as disclosed. The presence of an extender device 3 in a particular wireless network does not otherwise change any operation of these devices as disclosed herein.

Figure 3:
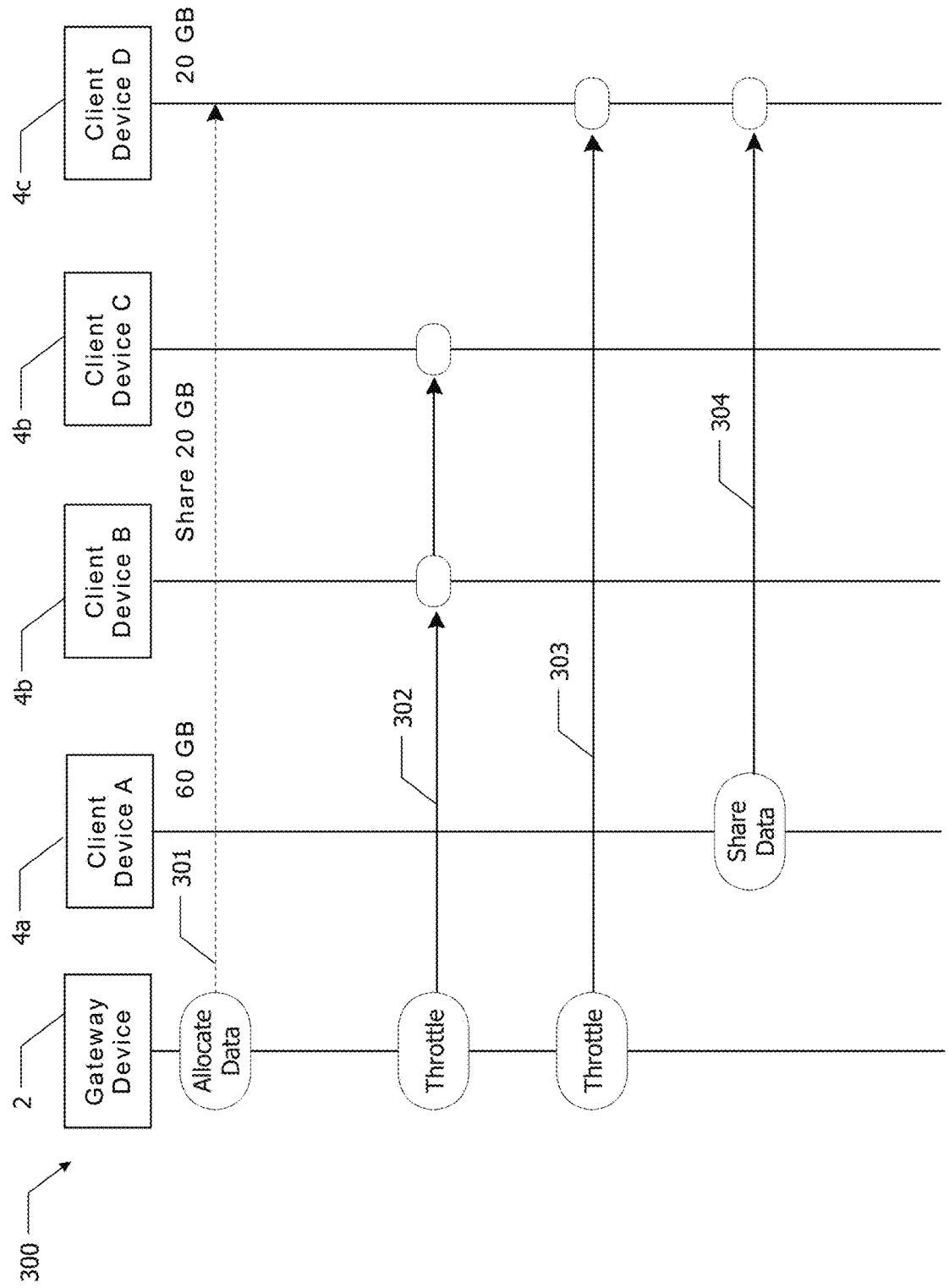
FIG. 3 illustrates a method and algorithm for personalized data throttling of individual client devices in a residential wireless network according to an embodiment of the present disclosure.

FIG. 3 illustrates a method and algorithm for personalized data throttling of individual client devices in a residential wireless network according to an embodiment of the present disclosure. In FIG. 3, it is assumed that the client device (e.g. client device 4), the gateway device 2, the Wi-Fi extender 1 (e.g. wireless extender 3), and Wi-Fi extender 2 (wireless extender 3) include their respective software 25, 32, 50 stored in their respective memories 24, 31, 49, which when executed by their respective controllers 26, 33, 51 perform the functions and operations in accordance with the embodiments described in the present disclosure (e.g. including optimized onboarding of client devices according to the embodiments of the present disclosure).

Although FIG. 3 shows one gateway device 2, one high priority client device 4a (e.g. client device A) and three low priority client devices 4b (e.g. client devices B-D), it is contemplated by the present disclosure that the method and algorithm can be applied to any number of gateway devices 2, high priority client devices 4a, and low priority client devices 4b for providing personalized data throttling of individual client devices in a residential wireless network to any number of wireless networks in the system of FIG. 1.

The process 300 begins when a gateway device 2 receives a periodic allotment of available data bandwidth in step 301 for use by devices connected to the gateway device 2 over a residential network. Typically, an ISP allocates a set amount of data per month or billing period. The gateway device 2 allocates a part of the total available data to each of the client devices 4a-b. In the embodiment shown in FIG. 3, client device A 4a is a high priority client device that is allocated 60 GB of data for use throughout the present allocation period. Client devices B-C 4b are low priority client devices that share an allocated 20 GB of data for use during the current allocation period. Client device D 4c also is a low priority device that has been individually allocated 20 GB of data for use during the current allocation period. Of course, a user may configure each client device 4 to be allocated any amount of bandwidth data as needed.

Next, at a later point in time in the month, client devices B-C 4b have consumed the entire allotment of 20 GB of data and the gateway device 2, in step 302, throttles client devices B-C 4b for the remainder of the month. When a gateway device 2 throttles a client device 4, the gateway device 2 may impose either data throttling or speed throttling. With data throttling, the gateway device 2 fully blocks Internet access to a client device 4 that is being throttled once its corresponding allocation of data has been consumed. In contrast, speed throttling occurs when the gateway device 2 reduces the uplink and downlink speeds to the client device 4 that has been throttled. In speed throttling, the connection to the Internet 6 remains operational, however the data transfer rates are reduced sufficiently that the client device 4 consumes negligible quantities of the reserved bandwidth remaining for high priority client devices 4a.

In addition, the speed throttling also may be imposed in an increasing level of throttling as the amount of data consumed approaches the allotted amount of data. For example, a client device 4 may receive the first 15 GB of data for the client device 4 allocated a total of 20 GB of data at the maximum available speed. For each of the remaining 1 GB of data of the allotted 20 GB of data, the gateway reduces the uplink and downlink speeds by an increasing amount of throttling. Once all of the 20 GB of data has been consumed, the gateway device 2 may then impose data throttling or impose speed throttling at a level that renders the client device 4 effectively unable to access the Internet 6.

Returning to FIG. 3, client device A 4a and client device D 4c continue to operate normally while client devices B-C 4b are throttled. In step 303, client device D 4c has consumed all of its allotted bandwidth data and the gateway device 2 once again imposes throttling upon this client device D 4c. Once this occurs, an administrator of the gateway device 2, may intercede on behalf of client device D 4c. In step 304, the administrator instructs the gateway device 2 to share a portion of the remaining data allocation from client device A 4a with client device D 4c. The administrator may instruct the gateway device 2 to change the allocation of data at any time while changing the allocation by any amount necessary to permit the client devices 4 attached to the gateway device 2 to operate as desired.

Figure 4:
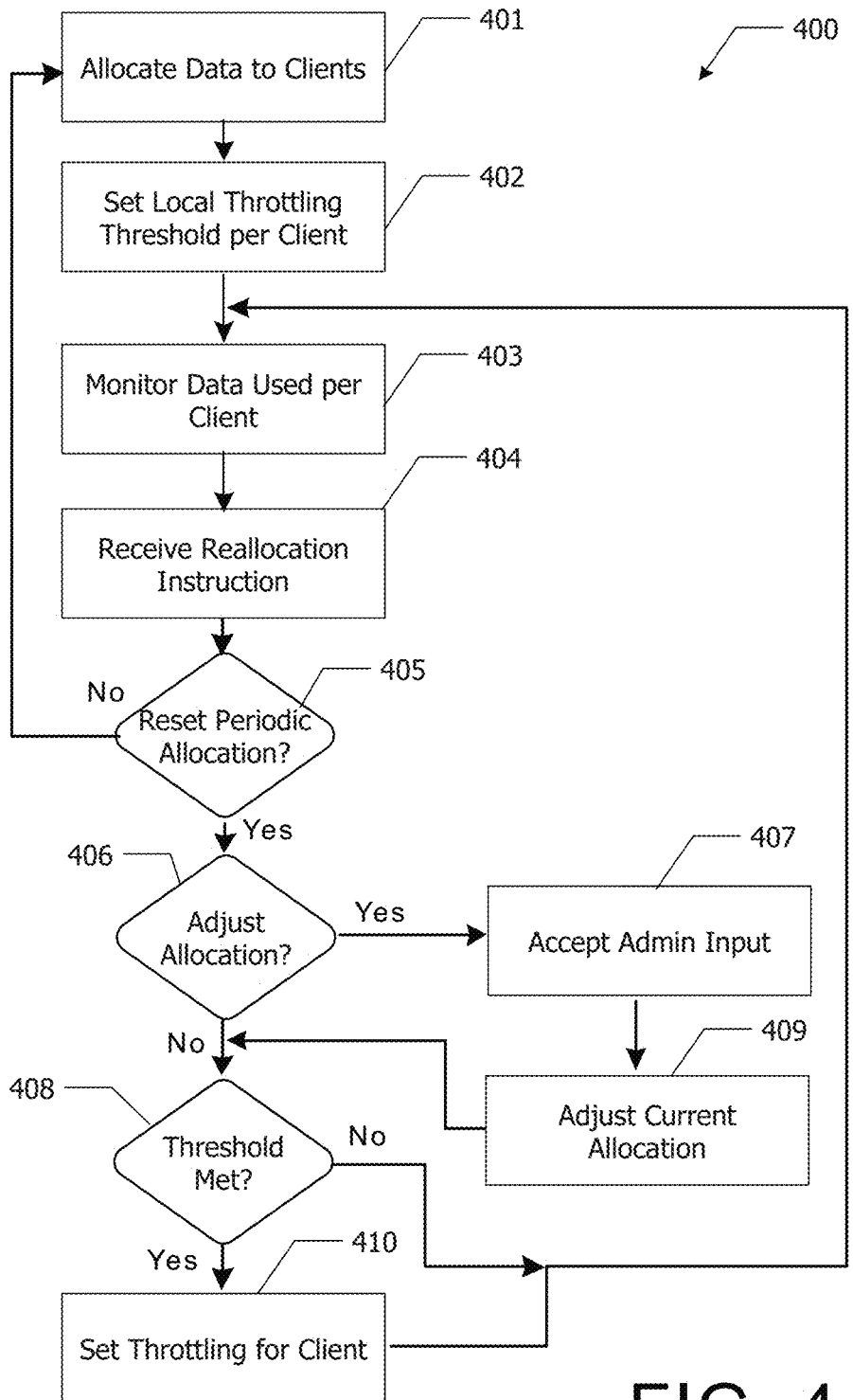
FIG. 4 illustrates a method and algorithm for personalized data throttling of individual client devices in a residential wireless network according to an embodiment of the present disclosure.

FIG. 4 illustrates a method and algorithm for personalized data throttling of individual client devices in a residential wireless network according to an embodiment of the present disclosure. The process 400 is a client device 2 receives a monthly allocation of bandwidth data from an ISP 1 and allocates a portion of the monthly allotment to each of the client devices 4 on the residential network in step 401. The gateway device 2, in step 402, sets a local throttling threshold for each of the client devices 4. This threshold is typically related to priority and is instituted just before the allotment is consumed.

In step 403, the gateway device 4 monitors the amount of bandwidth data consumed for each of the client devices 4 as the client devices access the Internet 6. The gateway device 2 also listens for an instruction from an administrator to manually re-allocate allotted bandwidth data in step 404. The gateway device 2, in test step 405, determines whether or not it is time to receive a new periodic allocation of bandwidth data from the ISP 1, and if so, the process 400 returns to step 401 to begin the process 400 as it starts a new allotment cycle.

When the gateway device 2 in test step 405 determines that it is not time to allocate a new data allotment, the gateway device 2 determines whether it has received a user instruction to reallocate bandwidth data in test step 406, and if so, the gateway device accepts the allocation instruction from the administrator in step 407 and applies the re-allocation of bandwidth data in step 408 before proceeding to test step 409. When the gateway device 2 determines that is has not received an instruction to reallocate bandwidth data, the process 400 proceeds directly to test step 409.

In test step 408, the gateway device 2 determines whether any of the client devices' data consumption has reached their respective assigned threshold. If the gateway device 2 determines that a client device 4 has reached its threshold, the gateway device 2 sets an appropriate level of throttling for that particular client device 4 in step 410 before returning to step 403 to continue monitoring data consumption; otherwise, the process 400 proceeds directly from test step 409 to step 403 to continue data consumption monitoring.

Figure 5:
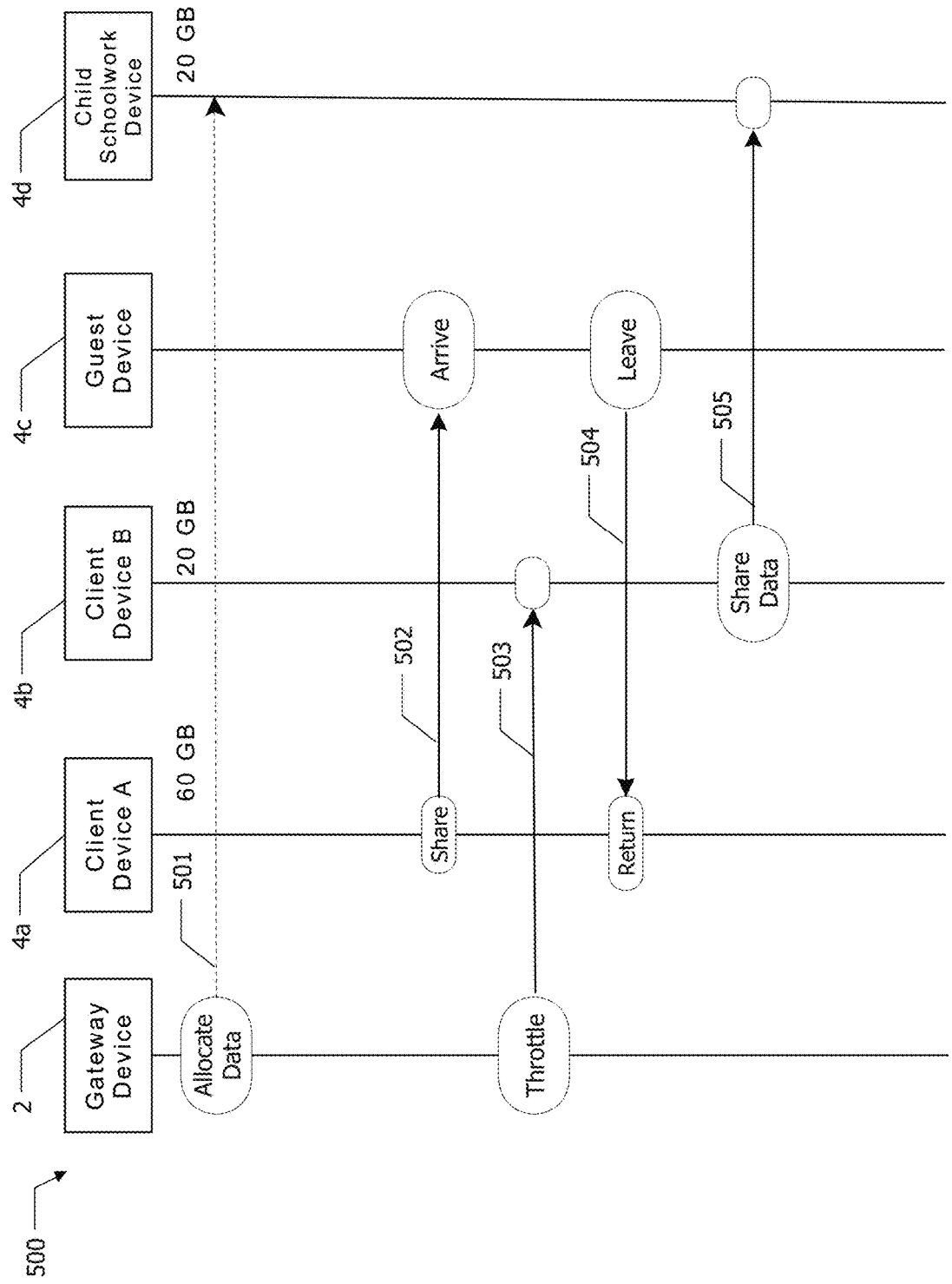
FIG. 5 illustrates a method and algorithm for personalized data throttling of individual client devices in a residential wireless network according to an embodiment of the present disclosure.

FIG. 5 illustrates a method and algorithm for personalized data throttling of individual client devices in a residential wireless network according to an embodiment of the present disclosure. In FIG. 5, it is assumed that the client devices (e.g. client device 4) and the gateway device 2, include their respective software 25, 32 stored in their respective memories 24, 31 which, when executed by their respective controllers 26, 33, perform the functions and operations in accordance with the embodiments described in the present disclosure (e.g., including optimized onboarding of a client devices according to the embodiments of the present disclosure).

Although FIG. 5 shows one gateway device 2, one high priority client device 4a (e.g. client device 1), one low priority client device 4b (e.g. client device 2), and two temporary high priority client devices (e.g. guest device 4c and child school work device 4d), it is contemplated by the present disclosure that the method and algorithm can be applied to any number of gateway devices 2, high priority client devices 4a, low priority client devices 4b, guest devices 4c and child school work devices 4d for providing personalized data throttling of individual client devices in a residential wireless network to any number of wireless networks in the system of FIG. 1.

The process 500 begins when the gateway device 2 receives a periodic allocation of bandwidth data and allocates an assigned amount to each of the client devices 4a-d. This periodic allocation of bandwidth data from the ISP 1 may occur at a defined data and time, typically on the same date each month at a pre-defined time. In some embodiments, the ISP 1 may provide a signal or message to the gateway device 2 that the allocation of bandwidth data has occurred. This signal or message may correspond to a disabling of any ISP-imposed data throttling that was performed in a periodic time period that just ended.

The process 500 continues with the gateway device 2 monitoring bandwidth data consumption for each client device 4a-d on the wireless network. A next event occurs when a guest device 4c joins the wireless network. The guest device 4c may join a main SSID network if the user of the guest device 4c has access information such as a network password. Alternatively, the guest device 4c may join a local guest wireless network provided by the gateway device 2; this local guest wireless network typically presents itself with an SSID of GUEST or some similar variant of the main wireless network's SSID. When the guest device 4c joins the wireless network, the gateway device 2 allocates an amount of bandwidth data for the guest device 4c to use while accessing the wireless network. In step 502, the gateway device 2 shares a portion of the allocated bandwidth data from client device A 4a to the guest device 4c for use while it is on the wireless network. The gateway device 2 may allocate any amount of data set by an administrator from any previously allocated set of data. The amount of bandwidth data and its source to be used by the guest device 4c may be set and changed at any time in a manner similar to the reallocation of bandwidth data disclosed above in reference to FIGS. 3-4.

The gateway device 2 continues to monitor data consumption of all of the client devices 4a-d, including the guest device 4c, and when one of the client devices, for example client device B 4b, reaches its threshold of allotted bandwidth data in step 503, the gateway device 2 may set a throttling condition for client device B 4b. This throttling condition remains in effect until either the gateway device 2 receives instructions from an administrator to reallocate a defined amount of data to client device B 4b or until the next periodic allocation of bandwidth data occurs.

At some point in time, the guest device 4c may disconnect from the wireless network, typically when the guest user leaves the residence supported by the gateway device 2 and its wireless network. At this point in time in step 504, any unused bandwidth data from the block of data previously allocated to the client device 4c is returned to its source, client device A 4a. If the guest device 4c, or any similar device joins the wireless network, the above allocation of bandwidth data may occur as long as the gateway device 2 has available bandwidth data remaining for a current periodic data cycle.

At a later point in time, a child schoolwork device 4d may either join the wireless network, or while present on the network, connect to a specific website defined by a prestored URL address that may be associated with schoolwork. At this point in time, as defined in step 505, the gateway device 2 recognizes the combination of the child schoolwork device 4d and the prestored URL to determine that the user of the child schoolwork device 4d is likely performing tasks that require use of bandwidth data to occur. In step 505, the gateway device 2 reallocates an amount of bandwidth data to the child schoolwork device 4d to permit this priority task to occur.

It is important to note that in the example of step 505, the child schoolwork device 4d may be a client device that receives its own periodic allocation of bandwidth data for use in each allocation cycle. One might expect that a child member of a residential household may use their client device for multiple purposes, including personal activities and school related activities. This sharing of data in step 505 may occur each time the child schoolwork device 4d accesses the school URL if the desired result is to allow the child user to not have the schoolwork data consumption also consume the periodic allocation of data. In other embodiments, the reallocation of data to the child schoolwork device 4d when accessing the prestored URL may also occur in step 505 only when the child schoolwork device 4d has already consumed its allotted amount of data. This option to use the shared data for accessing a particular URL of a school website is an operating policy choice set by the administrator in the gateway device 2. This data sharing in step 505 ensures that certain data access activities may occur regardless of other considerations of data consumption. Of course, one skilled in the art will recognize that the data sharing of step 505 may be useful for many specific tasks other than a child's schoolwork. Any combination of a client device identity and a URL address being accessed may be provided a priority to consume bandwidth data over other more routine data uses. The gateway device 2 may identify the client device 4d using any of the unique identifiers known to the gateway device 2, such as its assigned IP address, its model and serial number, its MAC address, and any other unique identifiers available to the gateway device 2. The prestored URL is recognizable to the gateway device 2 from the data connection requests sent through the gateway device 2 when the child schoolwork device 4d attempts to connect to a particular website.

Figure 6:
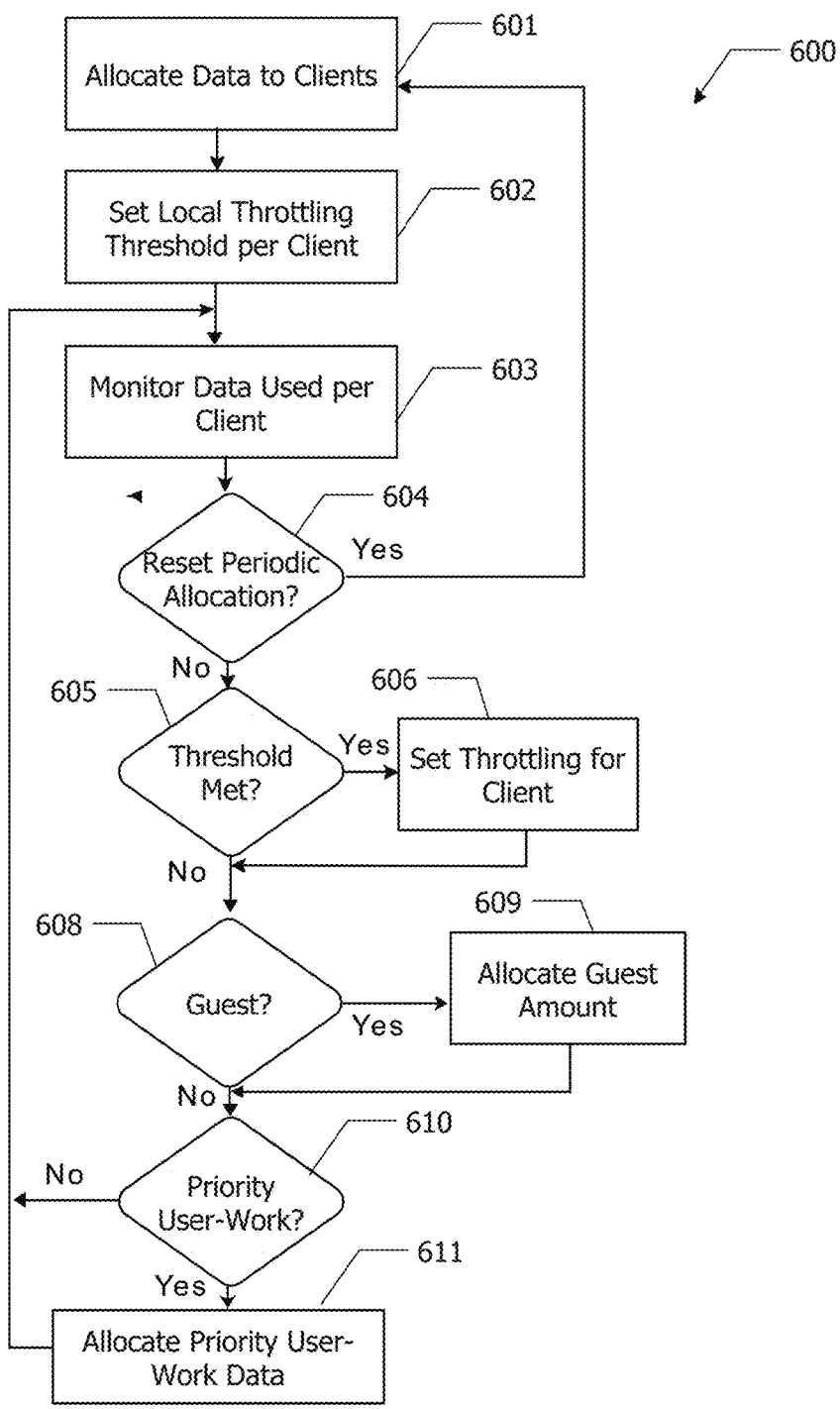
FIG. 6 illustrates a method and algorithm for personalized data throttling of individual client devices in a residential wireless network according to an embodiment of the present disclosure.

FIG. 6 illustrates a method and algorithm for personalized data throttling of individual client devices in a residential wireless network according to an embodiment of the present disclosure. The process 600 begins when the gateway device 2 allocates a periodic allotment of bandwidth data in step 601 and then sets local throttling thresholds for each client device 4a-d in step 602. Once so configured, the gateway device 2 begins monitoring data consumption for each client device 4a-d in step 603. Similar to the process of FIG. 4 above, test step 604 determines by the gateway device 2 whether or not a periodic allotment of bandwidth data has been received, and if so the process 600 returns to step 601 to begin processing for the next periodic allotment cycle.

If the gateway device 2 determines that a new allocation of data has not occurred, the gateway device 2 determines whether or not any of the client devices 4a-d has reached its local assigned threshold in test step 605, and if so, throttling is set by the gateway device 2 in step 606 before proceeding to test step 608. When the gateway device 2 determines that no local threshold has been met in test step 605, the process 600 proceeds directly to test step 608.

In test step 608, the gateway device 2 determines whether or not a guest device 4c has joined the wireless network, and if not, the process 600 proceeds directly to test step 610; otherwise the gateway device 2 shares bandwidth data with the client device 4c in step 609 before proceeding to test step 610. In test step 610, the gateway device 2 determines whether or not a child schoolwork device 4d is accessing a prestored URL for a particular website, and if not, the process 600 returns directly to test step 603 to continue monitoring bandwidth data consumption; otherwise the gateway device 2 shares bandwidth data with the child schoolwork device 4d in step 611 before returning to test step 603.

Figure 7:
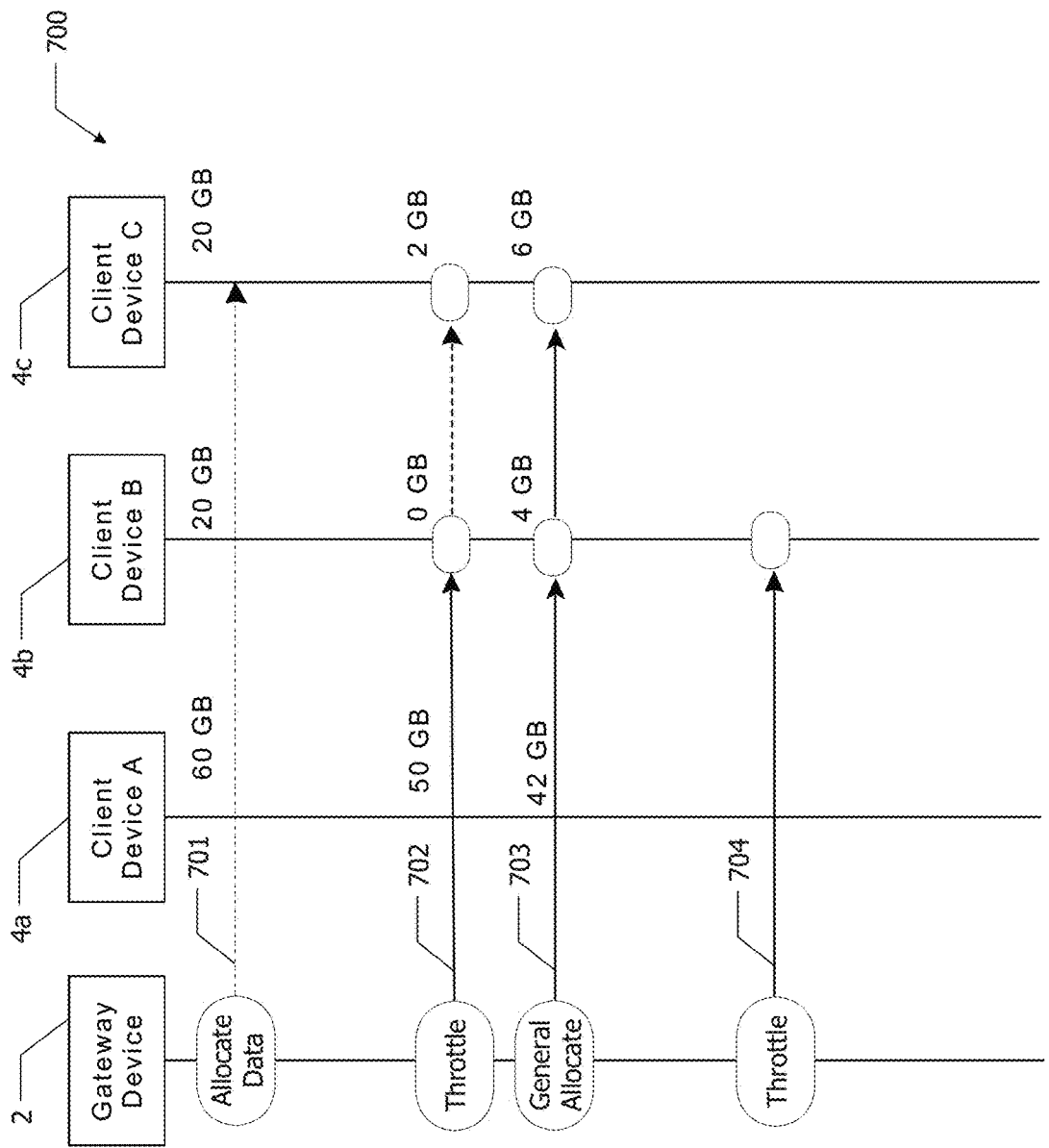
FIG. 7 illustrates a method and algorithm for personalized data throttling of individual client devices in a residential wireless network according to an embodiment of the present disclosure.

FIG. 7 illustrates a method and algorithm for personalized data throttling of individual client devices in a residential wireless network according to an embodiment of the present disclosure. In FIG. 7, it is assumed that the client devices (e.g., client device 4) and the gateway device 2 include their respective software 25, 32 stored in their respective memories 24, 31 which, when executed by their respective controllers 26, 33, perform the functions and operations in accordance with the embodiments described in the present disclosure (e.g., including optimized onboarding of client devices according to the embodiments of the present disclosure).

Although FIG. 7 shows one gateway device 2, one high priority client device 4a (e.g. client device 1), and two low priority client devices 4b (e.g. client devices 2-3), it is contemplated by the present disclosure that the method and algorithm can be applied to any number of gateway devices 2, high priority client devices 4a, and low priority client devices 4b for providing personalized data throttling of individual client devices in a residential wireless network to any number of wireless networks in the system of FIG. 1.

The process 700 begins when the gateway device 2 receives a periodic allocation of bandwidth data and allocates an assigned amount to each of the client devices 4a-c. In this particular example embodiment, client device A 4a is allocated 60 GB of data for this particular allotment cycle, client device B 4b is allocated 20 GB of data, and client device C 4c also is allocated its own 20 GB of data in step 701.

At a later point in time, client device B 4b reaches its local data consumption threshold and the gateway device 2 throttles its data in step 702. In step 702, client device A 4a has 50 GB of available data remaining in its data allocation, client device B 4b has 0 GB of available data remaining in its data allocation, and client device C 4c has 2 GB of available data remaining in its data allocation. The administrator decides to share data among all of the client devices 4a-c in step 703 by instructing the gateway device 2 to perform a general bandwidth relinquishment of data from a client device, for example client A 4a. In this example embodiment, the gateway device 2 is reallocating 8 GB of data from client device A 4a to client devices B and C 4b-c. This reallocation divides the reallocated data equally between client devices B and C 4b-c. After step 703, client device A 4a has 42 GB of available data remaining in its data allocation, client device B 4b has 4 GB of available data remaining in its data allocation, and client device C 4c has 6 GB of available data remaining in its data allocation, at which time, all of the client devices 4a-c are active. Later, client device B 4b has consumed this new allocation of data and the gateway device 2 once again throttles client device B 4b in step 704.

Figure 8:
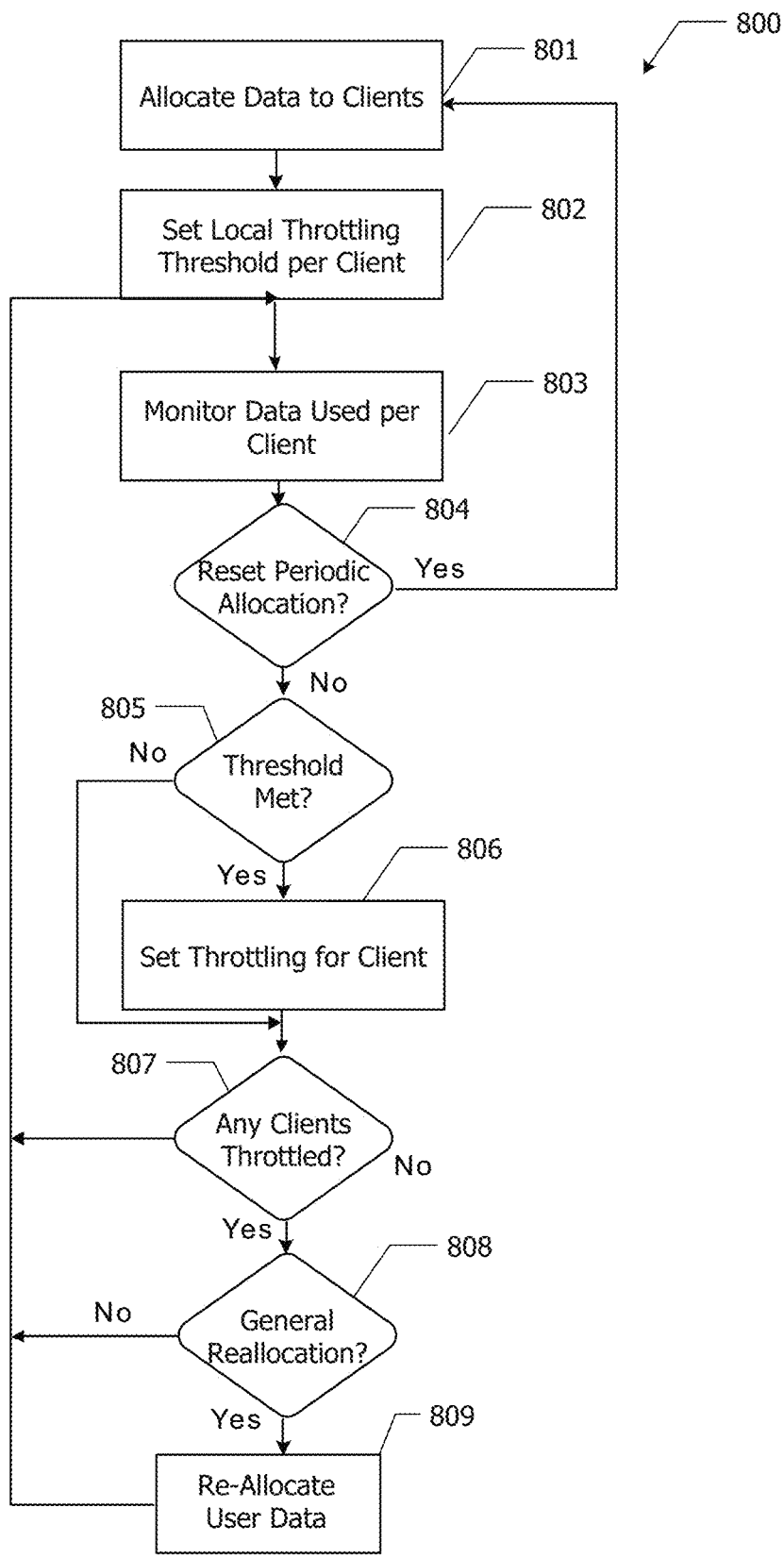
FIG. 8 illustrates a method and algorithm for personalized data throttling of individual client devices in a residential wireless network according to an embodiment of the present disclosure.

FIG. 8 illustrates a method and algorithm for personalized data throttling of individual client devices in a residential wireless network according to an embodiment of the present disclosure. The process 800 begins when the gateway device 2 allocates a periodic allotment of bandwidth data in step 801 and then sets local throttling thresholds for each client device 4a-d in step 802. Once so configured, the gateway device 2 begins monitoring data consumption for each client device 4a-d in step 803. Similar to the process of FIGS. 4 and 6 above, test step 804 determines by the gateway device 2 whether or not a periodic allotment of bandwidth data has been received, and if so the process 800 returns to step 801 to begin processing for the next periodic allotment cycle.

If the gateway device 2 determines that a new allocation of data has not occurred, the gateway device 2 determines whether or not any of the client devices 4a-c has reached its local assigned threshold in test step 805, and if so, throttling is set by the gateway device 2 in step 806 before proceeding to test step 807. When the gateway device 2 determines that no local threshold has been met in test step 805 the process 600 proceeds directly to test step 807.

In test step 807, the gateway device 2 determines whether or not any of the client device 4a-c has been throttled, and if not, the process 800 proceeds directly to test step 803 to continue monitoring bandwidth data consumption. When the gateway device 2 determines any of the client device 4a-c has been throttled in test step 807, the gateway device 2, in step 808, determines whether or not a general bandwidth relinquishment it to occur, and if not, the process 800 returns directly to test step 803 to continue monitoring bandwidth data consumption; otherwise the gateway device 2 shares bandwidth data with client devices B-C 4b-c in step 809 before returning to test step 803.

Figure 9:
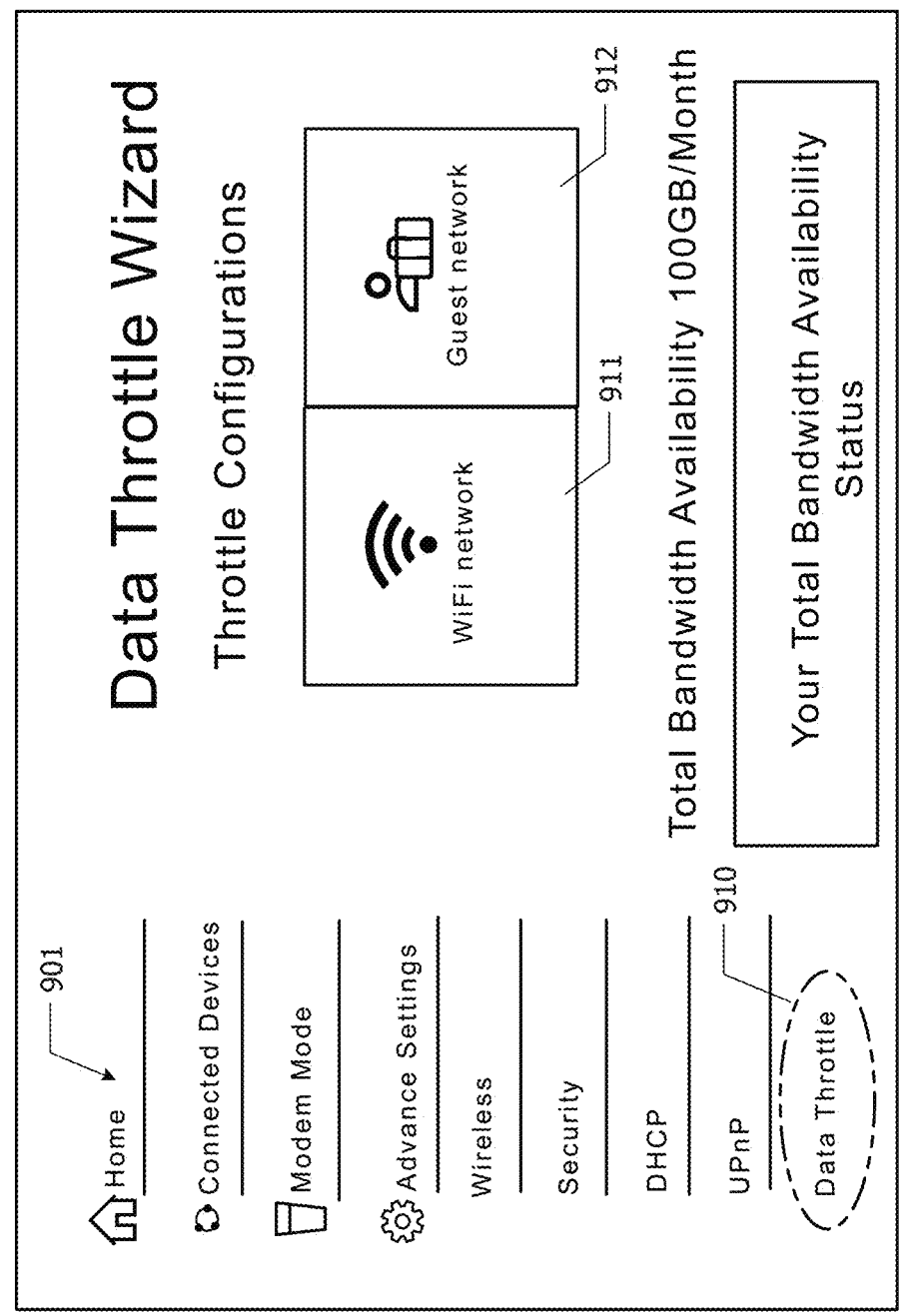
FIG. 9 illustrates an example embodiment of a gateway web interface for a user to configure personalized data throttling according to the present disclosure.

FIG. 9 illustrates an example embodiment of a gateway web interface for a user to configure personalized data throttling according to the present disclosure. Many gateway devices 2 provide an administrator access to settings within the gateway device 2 using a web interface via a web browser. While the administrator is using a client device on the wireless network, the administrator may access the web interface at a particular URL, typically the gateway device's 2 IP address. Using a set of web pages, the administrator may view and set many, if not all, of the internal operating settings for the gateway device 2.

Figure 10:
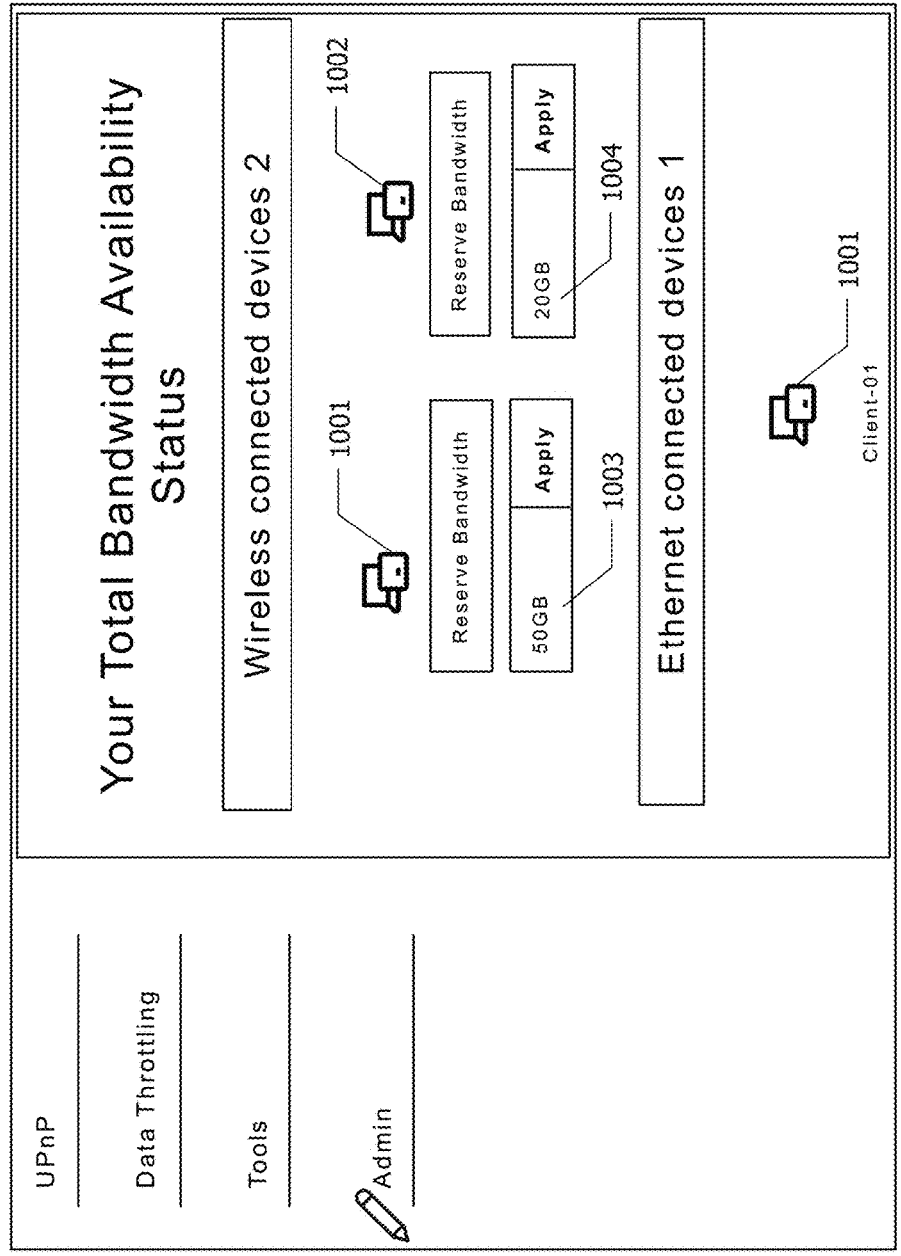
FIG. 10 illustrates an example embodiment of a gateway web interface for a user to configure personalized data throttling according to the present disclosure.

FIG. 9 shows an example web page for a gateway device 2 that is configuring local client device data throttling. On the web page 900, a set of navigation links 901 navigate the administrator to a set of corresponding web pages for groupings of the gateway device's 2 settings. One of these navigational links is a link 910 to a data throttling web page as shown in FIG. 10 below. The web page 900 also includes links 911-912 to separately configure throttling settings for both client devices 4 on the WiFi network 911 and the guest network 912 supported by the gateway device 2.

FIG. 10 illustrates an example embodiment of a gateway web interface for a user to configure personalized data throttling according to the present disclosure. Using the link 910, the administrator may access a web page 1000 to configure local bandwidth data thresholds for client devices on the wireless network. In FIG. 10, two wireless devices 1001-1002 are shown. Below each device identifier 1001-1002, data fields 1003-1004 provide the administrator an ability to enter data values to be used for each client device 1001-1002. Similar presentations of configurable data fields may be viewed by an administrator to create all of the example embodiments disclosed herein.

Client devices 1010 that are connected to the gateway device 2 using an ethernet connection rather than a wireless connection also are shown on the web page 1000. Client devices connected by ethernet also consume data from the ISP 1 and may be configured to operate as other client devices disclosed above. The type of connection to the gateway device may or may not be considered in defining whether and when client devices may be throttled locally by the gateway device. All of the example embodiments may be utilized for wired client devices in the same way wireless devices are configured herein.

Figure 11:
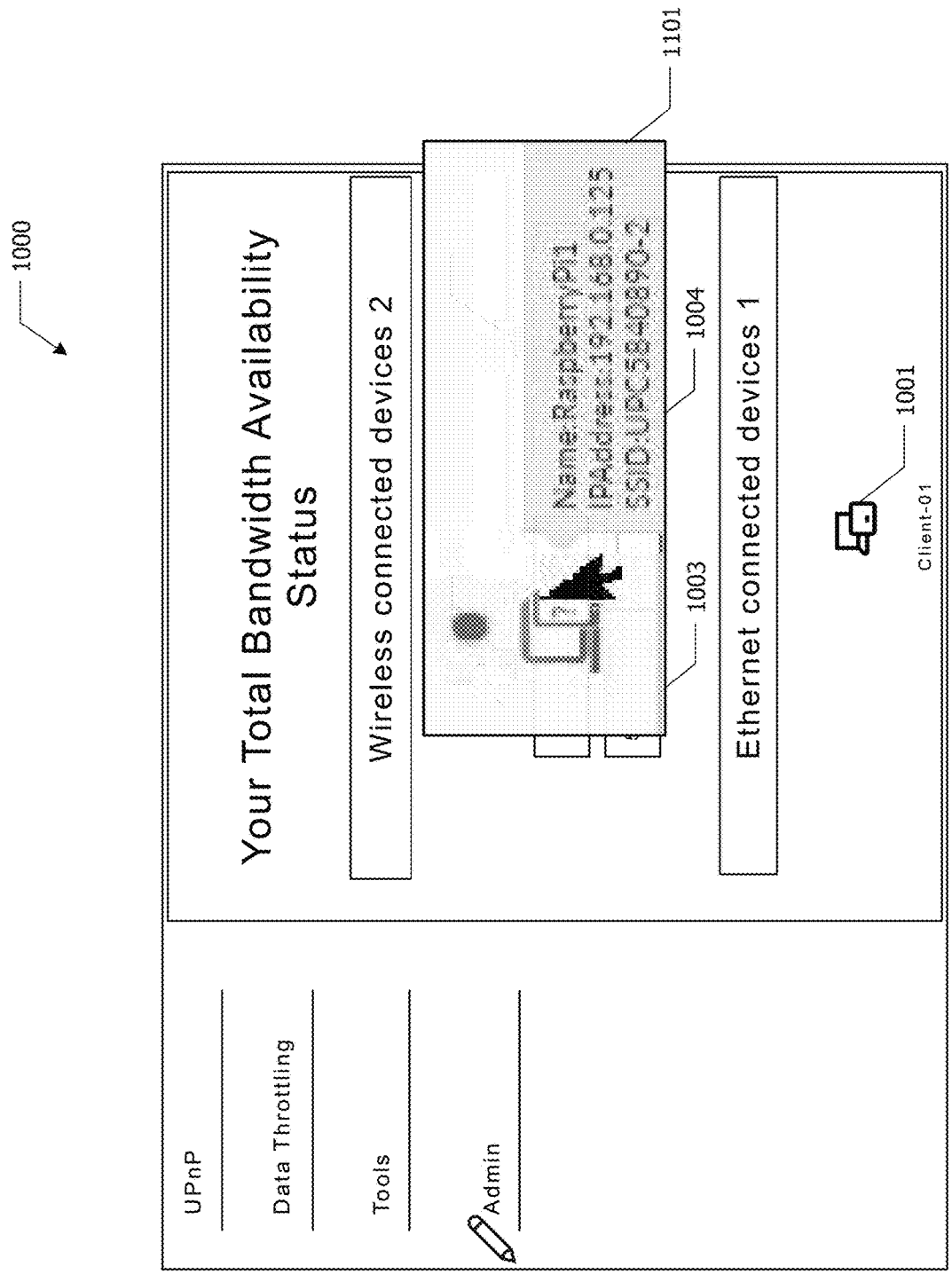
FIG. 11 illustrates an example embodiment of a gateway web interface for a user to configure personalized data throttling according to the present disclosure.

FIG. 11 illustrates an example embodiment of a gateway web interface for a user to configure personalized data throttling according to the present disclosure. When an administrator is configuring the data throttling allocations for each client device, the web page 1000 may present identifying data associated with the client devices. The web page 1000 may provide a device name, an IP address, and an SSID associated with the client device. FIG. 11 shows the user data as a small pop-up window 1101 overtop of a selected client device 1001 in which the data may be displayed. In other embodiments, the data may also be displayed within the main web page 1000 adjacent to the client device 1001 icon. Using this data, the administrator may properly identify a client device to properly allocate available bandwidth to the client devices on the wireless network.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), large scale integrated circuit (LSI), system LSI, super LSI, or ultra LSI components that perform a part or all of the functions described in the present disclosure.

The present disclosure includes the use of software, applications, computer programs or algorithms. The software, applications, computer programs or algorithms can be stored on a non-transitory computer-readable medium for causing a computer, such as the one or more processors, to execute the steps described in FIGS. 3 and 4. For example, the one or more memories stores software or algorithms with executable instructions and the one or more processors can execute a set of instructions of the software or algorithms in association with providing monitoring and installation enhancements in any number of wireless networks in accordance with the embodiments described in the present disclosure.

The software and computer programs, which can also be referred to as programs, software applications, applications, components or code, include machine instructions for a programmable processor and can be implemented in a high-level procedural language, an object-oriented programming language, a functional programming language, a logical programming language, an assembly language or a machine language. The term computer-readable recording medium refers to any computer program product, apparatus or device, such as a magnetic disk, optical disk, solid-state storage device, memory, and programmable logic devices (PLDs) used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically and discs reproduce data optically with lasers. Combinations of the above also are included within the scope of computer-readable media.

Use of the phrases "capable of," "capable to," "operable to," or "configured to" in one or more embodiments refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability or configuration set forth in the claims. Changes may be made in the function and arrangement of elements discussed without departing from the spirit and scope of the disclosure. Various embodiments may omit, substitute or add various procedures or components as appropriate. For instance, features described with respect to certain embodiments may be combined in other embodiments.

We claim:

1. A gateway device for client access of a network device in a wireless network, the wireless network configured to communicatively interconnect the gateway device and one or more client devices to the Internet, the gateway device comprising:
   a memory having instructions stored thereon; and
   a processor configured to execute the instructions on the memory to cause the gateway device to:
      allocate periodically a portion of available data transfer amounts per allocation period for each of the one or more client devices using a connection to the Internet via the one or more client devices;
      separately monitor data transfer amounts used by each of the one or more client devices over the connection associated with each of the one or more client devices; and
      in a case in which the gateway device has determined that one of the client devices has used all of the allocated data transfer amounts, throttle the connection associated with the one of the client device.

2. The gateway device according to claim 1, wherein the processor configured to further execute the instructions on the memory to cause the gateway device to:
   receive commands from an administrator to re-allocate a specified amount of available data transfer amounts currently available to a first client device to a second client device; and
   re-allocate the specified amount of available data transfer amounts currently available to a first client device to a second client device.

3. The gateway device according to claim 1, wherein the processor configured to further execute the instructions on the memory to cause the gateway device to:
   detect a guest device joining a wireless network supported by gateway device;
   re-allocate the specified amount of available data transfer amounts currently available to a first client device to the guest device; and
   continue to separately monitor data transfer amounts used by each of the one or more client devices over the connection associated with each of the one or more client devices.

4. The gateway device according to claim 3, wherein the processor configured to further execute the instructions on the memory to cause the gateway device to:
   detect the guest device leaving the wireless network supported by gateway device; and
   re-allocate any remaining amount of available data transfer amounts currently available to the guest device back to its original client device.

5. The gateway device according to claim 2, wherein the processor configured to further execute the instructions on the memory to cause the gateway device to:

detect a third client device accessing a website accessed using a prestored URL address; and re-allocate the specified amount of available data transfer amounts currently available to a fourth client device to the third device.

6. The gateway device according to claim 2, wherein the processor configured to further execute the instructions on the memory to cause the gateway device to:

in a case in which the gateway device has determined that the second client devices has used all of the re-allocated data transfer amounts, throttle the connection associated with the one of the client device.

7. The gateway device according to claim 3, wherein throttling one of the client devices comprises fully blocking data transfers to and from the Internet to prevent further consumption of bandwidth data.

8. The gateway device according to claim 3, wherein throttling one of the client devices comprises reducing the uplink and downlink data transfer speeds to a low level in order to keep the connection operational while consuming a negligible amount of bandwidth data.

9. A method for operation of a network device in a wireless network, the wireless network configured to communicatively interconnect a gateway device including a network controller and one or more client devices, the method comprising:

allocating periodically a portion of available data transfer amounts per allocation period for each of the one or more client devices using a connection to the Internet via among the one or more client devices;

separately monitoring data transfer amounts used by each of the one or more client devices over the Internet connection associated with each of the one or more client devices; and in a case in which the gateway device has determined that one of the client devices has used all of the allocated data transfer amounts, throttling the connection associated with the one of the client device.

10. The method according to claim 9, wherein the method further comprises:

receiving commands from an administrator to re-allocate a specified amount of available data transfer amounts currently available to a first client device to a second client device; and re-allocating the specified amount of available data transfer amounts currently available to a first client device to a second client device.

11. The method according to claim 9, wherein the method further comprises:

detecting a guest device joining a wireless network supported by gateway device;

re-allocating the specified amount of available data transfer amounts currently available to a first client device to the guest device; and continuing to separately monitor data transfer amounts used by each of the one or more client devices over the connection associated with each of the one or more client devices.

12. The method according to claim 11, wherein the processor configured to further execute the instructions on the memory to cause the gateway device to:

detecting the guest device leaving the wireless network supported by gateway device; and re-allocating any remaining amount of available data transfer amounts currently available to the guest device back to its original client device.

13. The method according to claim 10, wherein the method further comprises:

detecting a third client device accessing a website accessed using a prestored URL address; and re-allocating the specified amount of available data transfer amounts currently available to a fourth client device to the third device.

14. The method according to claim 10, wherein the method further comprises:

in a case in which the gateway device has determined that the second client devices has used all of the re-allocated data transfer amounts, throttling the connection associated with the one of the client device.

15. A non-transitory computer-readable recording medium in a gateway device for operation of a network device in a wireless network, the wireless network configured to communicatively interconnect the gateway device and one or more client devices, the non-transitory computer-readable recording medium storing one or more programs which, when executed by a network controller of the gateway device, performs steps comprising:

Allocate periodically a portion of available data transfer amounts for each of the one or more client device using a connection to the Internet via among the one or more client devices;

separately monitor data transfer amounts used by each of the one or more client devices over the connection associated with each of the one or more client device; and in a case in which the gateway device has determined that one of the client devices has used all of the allocated data transfer amounts, throttle the connection associated with the one of the client device.

16. The non-transitory computer-readable recording medium according to claim 15, wherein the processor configured to further execute the instructions on the memory to cause the gateway device to:

receive commands from an administrator to re-allocate a specified amount of available data transfer amounts currently available to a first client device to a second client device; and re-allocate the specified amount of available data transfer amounts currently available to a first client device to a second client device.

17. The non-transitory computer-readable recording medium according to claim 15, wherein the processor configured to further execute the instructions on the memory to cause the gateway device to:

detect a guest device joining a wireless network supported by gateway device;

re-allocate the specified amount of available data transfer amounts currently available to a first client device to the guest device; and continue to separately monitor data transfer amounts used by each of the one or more client devices over the connection associated with each of the one or more client devices.

18. The non-transitory computer-readable recording medium according to claim 17, wherein the processor configured to further execute the instructions on the memory to cause the gateway device to:

detect the guest device leaving the wireless network supported by gateway device; and re-allocate any remaining amount of available data transfer amounts currently available to the guest device back to its original client device.

19. The non-transitory computer-readable recording medium according to claim 16, wherein the processor configured to further execute the instructions on the memory to cause the gateway device to:
- detect a third client device accessing a website accessed using a prestored URL address; and
- re-allocate the specified amount of available data transfer amounts currently available to a fourth client device to the third device.

20. The non-transitory computer-readable recording medium according to claim 16, wherein the processor configured to further execute the instructions on the memory to cause the gateway device to:
- in a case in which the gateway device has determined that the second client devices has used all of the re-allocated data transfer amounts, throttle the connection associated with the one of the client device.

\* \* \* \* \*